United States Patent [19]

Daughtry

[11] 4,145,909
[45] Mar. 27, 1979

[54] PIPELINE BENDING METHOD

[75] Inventor: Arthur C. Daughtry, Houston, Tex.

[73] Assignee: Exxon Production Research Company, Houston, Tex.

[21] Appl. No.: 886,193

[22] Filed: Mar. 13, 1978

[51] Int. Cl.$^2$ .............................................. B21D 7/00
[52] U.S. Cl. ..................... 405/168; 72/369; 405/171
[58] Field of Search ................. 72/369; 61/107, 109, 61/112, 113, 114, 72.6

[56] References Cited

U.S. PATENT DOCUMENTS

| | | | |
|---|---|---|---|
| 3,431,739 | 3/1969 | Richardson et al. | 61/109 |
| 3,466,882 | 9/1969 | Broussard | 61/109 |
| 3,524,325 | 8/1970 | Brown | 61/109 |
| 3,650,114 | 3/1972 | Neal | 61/109 |
| 3,765,185 | 10/1973 | Peck et al. | 61/109 |
| 3,955,599 | 5/1976 | Walker | 72/369 |
| 4,063,430 | 12/1977 | Lamy | 61/113 |

OTHER PUBLICATIONS

*Rigid Flowline Connection,* Ocean Industry, vol. 12, No. 8, p. 45, Aug. 1977.

*Primary Examiner*—Lowell A. Larson
*Attorney, Agent, or Firm*—S. J. Casamassima; G. D. Lawson

[57] ABSTRACT

A method for the controlled bending of a submerged pipeline is disclosed. The section of the pipeline which is to be bent is slightly elevated off the sea floor, preferably by buoys attached to the pipeline along its length. The end of the elevated section of pipeline is pulled in to the desired point of termination while a drag force is simultaneously applied to the elevated portion of the pipeline. The applied drag force should be sufficient to create a bending moment which causes the pipeline to bend along a well defined arc. Preferably, dragging means such as chains, cables, or clump weights extending from the pipeline to the sea floor are used to impose the necessary drag force on the pipeline and to control elevation of the pipeline above the sea floor.

14 Claims, 9 Drawing Figures

PIPELINE BENDING METHOD

BACKGROUND OF THE INVENTION

1. Field of the Invention

The present invention relates to the bending of pipe. More particularly, it relates to the bending of submerged pipeline used for the transportation of oil and gas from offshore wells and production facilities.

2. Description of the Prior Art

The development of offshore oil fields in deep waters has necessitated the laying of lengthy pipelines in order to transport oil and gas from remotely located fields to more centrally located production facilities and storage terminals. A major problem frequently encountered in laying pipeline is the making of pipeline connections, especially the second end connection of the pipelines. If a pipeline is laid over great distances and in deep waters, it is almost impossible to precisely align the end of the pipeline with its desired point of termination point. In most instances, correction of the misalignment must be made in order to make the final pipeline connection.

One conventional approach for correcting misalignment is to add a spool piece between the end of the pipeline and the point of termination. Normally, the spool piece is a specially designed section of pipe which is accurately fabricated and cut so as to correct for any misalignment. After it is fabricated, the spool piece must be either welded or flange connected to the pipeline end. In shallow waters, joinder of the spool piece and pipeline can be accomplished with the assistance of divers. Beyond demonstrated diver capability depths of about 500 feet, the spool piece must either be remotely installed or the pipeline end must be retrieved for an above surface connection. Retrieval of the pipeline and above surface connection is a time consuming and extremely expensive technique. Other techniques such as remote installation using subsea manipular devices are still unproven and may not provide the reliable, repairable, leakfree connections which are required of an underwater pipeline bend.

Another, less conventional, approach is to bend the pipeline itself to correct for the misalignment. As the pipeline approaches its point of termination it is a relatively simple matter to compute the amount of bending necessary to terminate the pipeline end at the desired target. In most instances, the pipeline should be laid out so that it can be bent at approximately a right angle. Such a "right angle" termination automatically adjusts for errors in pipeline length and angular misalignment and permits the use of relatively simple connector tools to make up the final connections.

The major problem with pipeline bending is the difficulty encountered in accurately bending the pipe and bending it a sufficient distance without buckling or otherwise damaging the pipe. If the pipeline is lifted or suspended off the sea floor there is great difficulty in bending the pipe a sufficient amount since there are no restraining forces on the pipe to effect an adequate bending moment. On the other hand, if the pipe is rested on the sea floor, the inertial forces caused by the heavy pipeline laying on the pliant sea floor will be extremely high, making the pipeline difficult to move or bend gradually. However, once the frictional forces are overcome the pipeline is likely to move very rapidly, making accurate bending difficult to control and possibly causing the pipeline to buckle or deform.

There is, therefore, a need in the art for a reliable technique for accurately bending offshore pipeline so as to permit expedient and economical pipeline connections.

SUMMARY OF THE INVENTION

The present invention overcomes the problems unresolved by the prior art by providing a method for the controlled bending of submerged pipelines, thereby permitting rapid and economical subsea pipeline connection. The method comprises buoyantly elevating the terminal portion of a pipeline to a position above the sea floor and then pulling in the end of the elevated portion to a point of termination or connection while simultaneously applying a drag force to the elevated portion of the pipeline. The applied drag force should be sufficient to cause the pipeline to bend along a well defined arc.

In practicing the present invention, the pipeline can be buoyantly elevated by attaching buoys to the last sections of pipe that are added to the pipeline as it is being laid on the sea floor. Preferably, the attached buoys are intermittently spaced along the length of the terminal portion of the pipeline which is to be bent. The buoys should provide enough buoyancy to elevate the terminal portion of the pipeline a short distance above the sea bottom. Additionally, it is also preferable to attach dragging means to the terminal portion of the pipeline during the pipe laying operation. The dragging means can be chains, cables, weights (e.g., clump weights) which hang from the pipeline and which contact or partially rest on the sea floor when the pipeline is in its buoyantly elevated position. The points of attachment of the dragging means can be coincident to the points of attachment of the buoys to the pipeline.

The actual blending of the pipeline is preferably accomplished by pulling in the end of the pipeline by means of a cable, such as a tether line, which extends from the pipeline to the point of termination. As the end of the elevated portion of the pipeline is pulled into the point of termination, the dragging means will be in contact with the sea floor and will exert a drag force to the elevated portion of the pipeline. The drag force should be sufficient so that the pipeline will bend along a smooth, well defined arc as it is pulled in. In this manner the elevated portion of the pipeline can be bent with precision and control and without buckling or damaging the pipeline. Once bent, the pipeline end can be quickly connected at its point of termination without the need for specially fabricated spool piece connections.

DESCRIPTION OF THE PREFERRED EMBODIMENT

Figure 1:
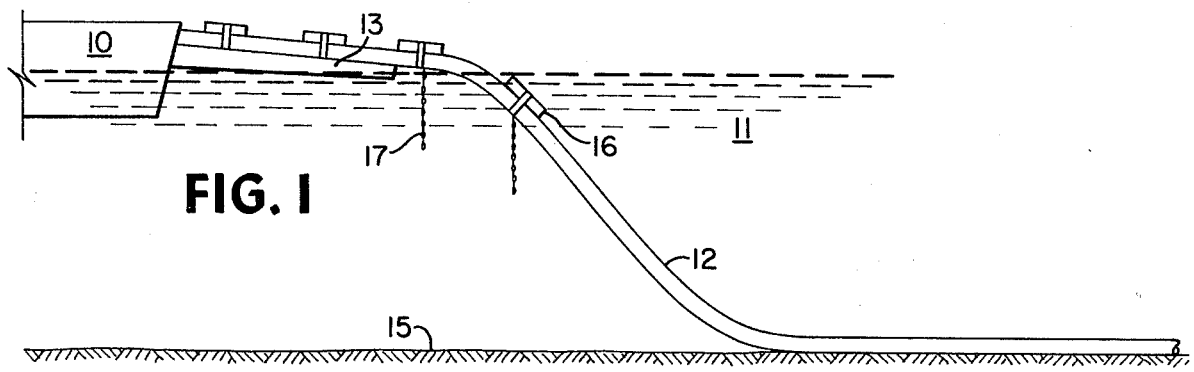
FIGS. 1-3 are schematic elevation views sequentially depicting a pipeline being laid on the ocean floor.

Referring to FIG. 1, the stern of a pipe laying barge 10 is shown floating on a body of water 11. Aboard barge 10, sections of pipe are assembled to form pipeline 12 which is lowered into the water as the barge advances. Guiding and supporting pipeline 12 as it is lowered into the water is stinger 13. The stinger is a lengthy ramp-type frame structure which trails from the stern of barge 10 at a moderate incline. It serves the important function of reducing the unsupported length of the pipeline as it passes from barge 10 to sea floor 15, thereby imparting the necessary curvature to avoid buckling of the pipeline as it is being laid.

As the pipeline approaches its point of termination, the pipelaying technique is somewhat altered in order to permit the subsequent practice of the present invention. At intervals along the terminal portion of pipeline 12, buoys 16 and chains 17 are attached to the pipeline. Preferably, each buoy 16 is matched with a corresponding chain 17. Chains 17 may be standard linked chains, as shown, or they may be heavy cables or clump weights.

Figure 2:
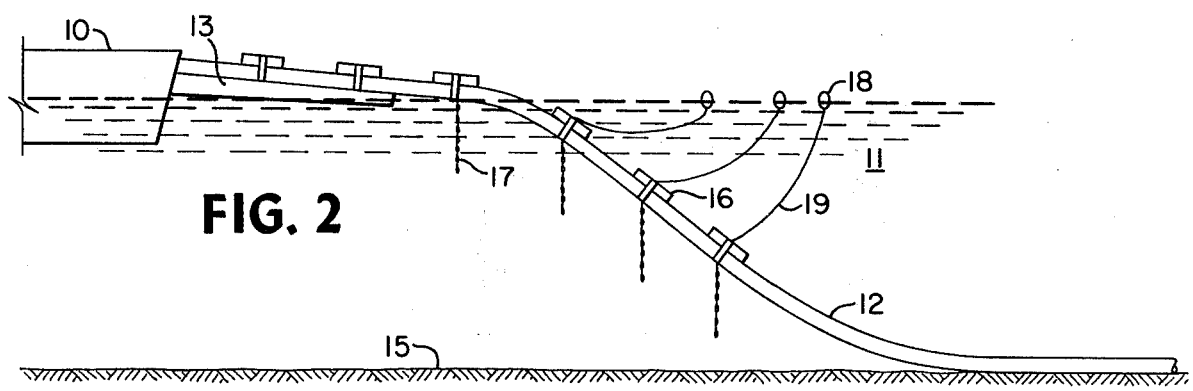
Figure 3:
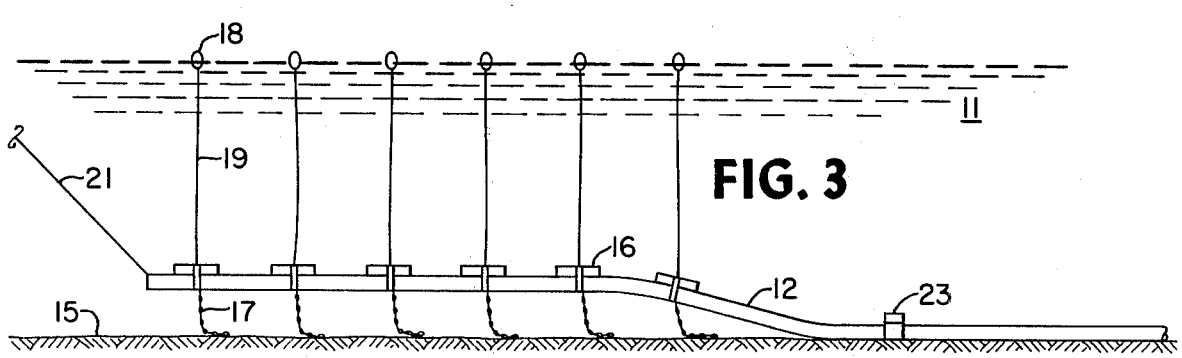

FIGS. 1 to 3 sequentially depict the lowering of the terminal portion of pipeline 12. The location of the buoys and chains added to the pipeline is indicated by floats 18 which are tied to tag lines 19. The buoys and chains are selected so as to provide the terminal portion of the pipeline with a slight negative buoyancy. Therefore, as the buoys and chains are added to the pipeline, as shown in FIG. 2, the pipeline descends until the chains contact the sea floor. Once the chains touch bottom, the pipeline is relieved of that portion of the chain length which comes to rest on the sea floor. Ultimately, the terminal portion of the pipeline achieves a neutral buoyancy a short distance above the sea floor. After the last joint of pipe is added to pipeline 12 as shown in FIG. 3 the end of pipeline 12 is lowered into the water by means of tether line cable 21. The terminal portion of the pipeline containing the attached buoys and chains will sink to a level slightly above sea floor 15. The system should be designed so that the terminal portion of the pipeline achieves a neutral buoyancy at between about two feet and ten feet above the sea floor.

It should be noted that there are alternative procedures available for laying the pipeline to achieve the suspended position shown in FIG. 3. For example, floating, preassembled pipeline sections can be towed out to the site where the pipeline is to be laid. Buoys attached along the entire length of the pipeline sections would maintain the sections afloat at or near the surface of the water. A lay barge would then be used to connect the pipeline sections, remove the buoys, and lay the assembled pipeline on the sea floor. (See, for example, U.S. Pat. No. 3,690,111 for a more detailed description of this procedure.) The pipelaying procedure is then altered somewhat for the terminal portion of the pipeline. The buoys attached to the terminal portion of the pipeline are left intact and chains are added at points approximately coincident with the buoys. The terminal portion, after submergence in the water, would then, as previously described, descend to a position slightly elevated above the sea floor as shown in FIG. 3.

Figure 4:
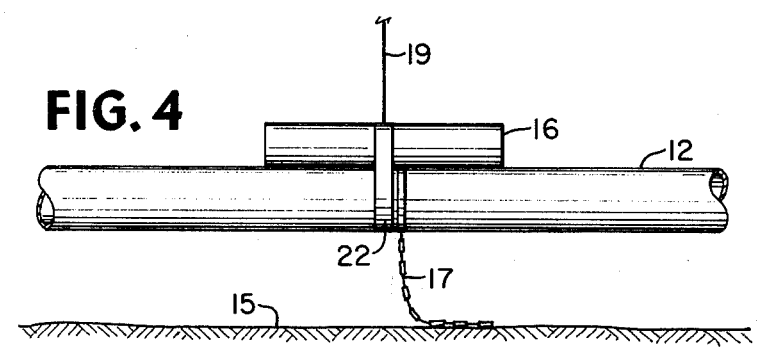
FIG. 4 is an enlarged schematic view of the end of the pipeline as it is being drawn to a point of connection.

FIG. 4 shows an enlarged view of a segment of pipeline 12 in its final position suspended above sea floor 15. Buoy 16 is shown in the drawing as a cannister held by place by strap 22. Alternatively, other buoyant mechanisms such as buoyancy cans or syntactic jackets can also be employed. Means should also be provided for ultimately sinking the pipeline to the sea floor either by releasing buoys 16 to the surface or by flooding them with water. Chains 17 are heavy link chains which partially rest on the sea floor. Preferably, about one-half of the chain length rests on the sea floor. The spacing of the chains along the length of the pipeline should be adequate so that there is no chance of their entanglement.

Figure 5:
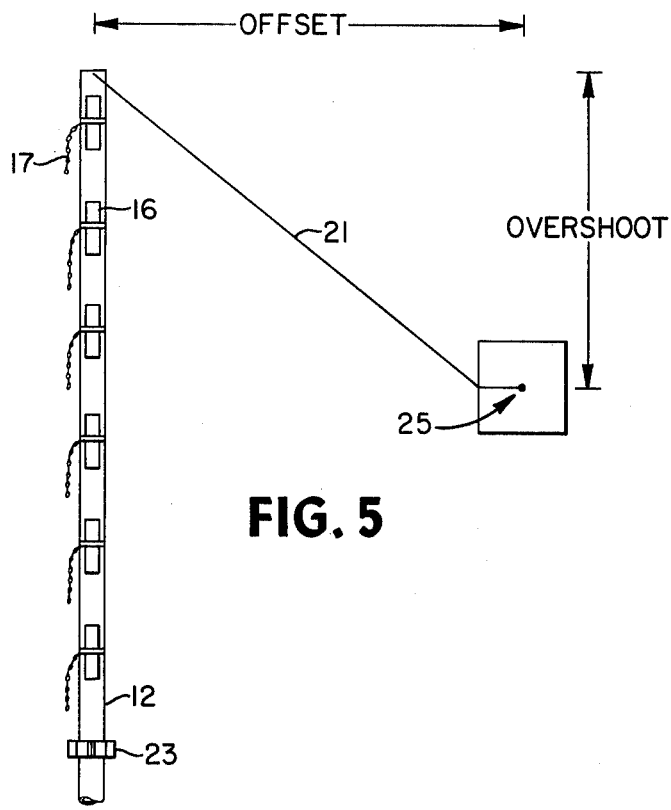
FIG. 5 is a plan view of the pipeline in its original configuration prior to it being bent.
Figure 6:
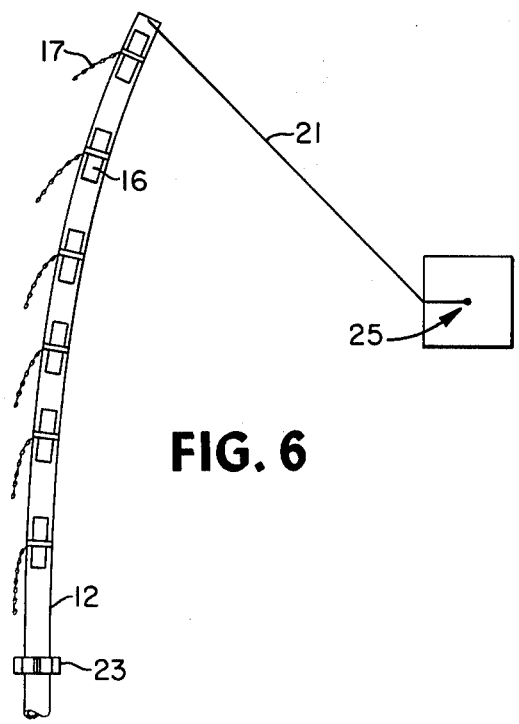
FIG. 6 is a plan view of the pipeline in an intermediate configuration during bending operations.

With the terminal portion of the pipeline suspended in the manner shown in FIG. 3, the pipeline can now be bent in accordance with the method of the present invention. Reference is now made to FIG. 5 which is an overhead or plan view of pipeline 12 prior to the bending operation. The elevated section of the pipeline is shown in the drawing as commencing at a point just prior to the location of the first buoy 16 and chain 17. Just behind the elevated pipeline section is located a clamp 23 which pins the grounded section of pipeline 12 to the sea floor. Clamp 23 prevents sudden slippage of the grounded section of the pipeline once bending operations are commenced.

Figure 7:
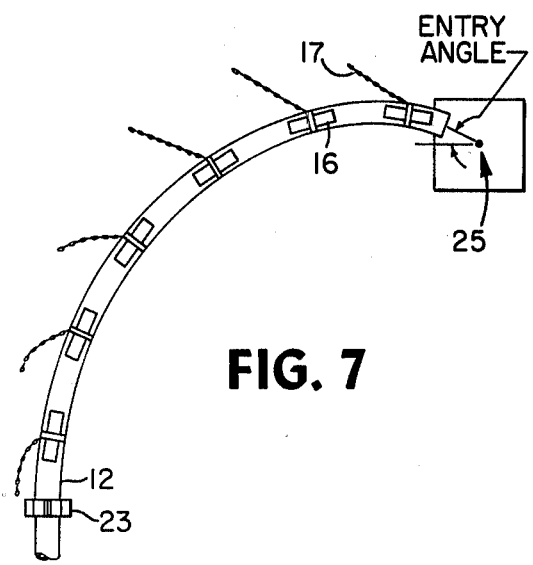
FIG. 7 is a plan view of the pipeline in its final configuration after it has been bent in accordance with the method of the present invention.

Prior to the bending of pipeline 12, tether line 21 to which the end of the pipeline is connected, is drawn over to pull-in point 25. Pull-in point 25 is the desired terminal point of the pipeline and may, for example, be a subsea manifold, a wellhead or the site of a production riser. Tether line 21 is threaded through pull-in point 21 and is held taut at the surface by a vessel capable of pulling in the tether line. Reference is now made to FIGS. 5 and 7 which sequentially depict the movement of pipeline 12 as it is being bent to make connection with pull-in point 21.

In practicing the method of the present invention, the end of the elevated portion of pipeline 12 is slowly pulled in the direction of pull-in point 25 by means of tether line 21. Preferably, a cable reeling device located aboard a surface vessel positioned above pull-in point 25 will reel in the tether line at a slow but constant pace. As the pipeline is pulled in, chains 17 drag along the sea floor and exert a uniform frictional drag force along the portion of the pipeline that is being bent. The simultaneous application of the drag force while the pipeline is pulled permits the pipeline to smoothly bend along a well defined arc, thereby greatly minimizing the chance of buckling or damaging the pipeline. The drag force imparted by the chains should be sufficient to cause the pipeline to bend smoothly. However, the chains should not be excessively heavy or lengthy so as to require an inordinate amount of pulling force on the tether line to bring the pipeline to its point of connection.

Figure 8:
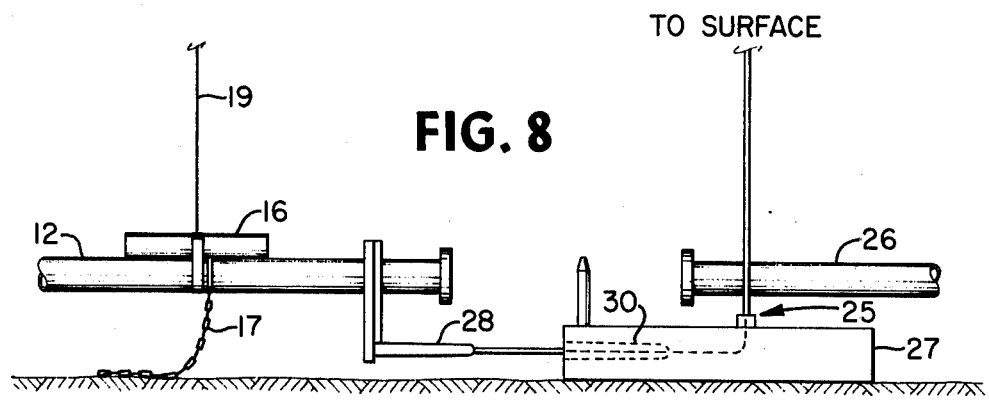
FIG. 8 is a schematic elevation view of the end of the pipeline as it is being drawn into a point of connection.

FIG. 8 illustrates the end of pipeline 12 as it approaches its pull-in point for connection to terminal line 26. Terminal line 26 may be a flowline which carries crude oil or other hydrocarbons from pipeline 12 to an onshore storage facility. Serving as the pull-in point for pipeline 12 is base plate 27. Prong 28 laterally extends from the end of pipeline 12 and is securely attached to tether line 21. Tether line 21 threads into cylinder 30 located within base plate 27 and tangentially exits at the rear of the base plate from where it is drawn to the surface. In this manner, tether line 21 can be slowly pulled in until prong 28 stabs into cylinder 30. Base plate 27 can also be rotated slightly to help make the connection with prong 28 should there be some axial misalignment of prong 28 with cylinder 30. A latching means (not shown) may be used to hold prong 28 in place while a connection between the ends of pipeline 12 and terminal line 26 is made. At this point the pipe bending operation is completed.

SCALE TESTING

The method of the present invention was tested using a scaled down version of an offshore pipeline. The scale model pipeline chosen was a 125 foot length of ½ inch O.D. pipe. The model pipeline was assembled for six twenty-foot segments of pipe which were connected together at each joint by 4½ inch long collars. Each end of the pipeline was sealed with a cork. Attached to the last 83 feet of the pipeline at three foot intervals were buoys. Each buoy consisted of a 16 ounce sealed glass bottle partially filled with water so that the net buoyancy of each bottle was 7 ounces. Link chains, each two feet in length and weighing 0.850 pounds, were attached to pipeline at points coincident with the buoys. The model pipeline was then submerged in the pond and secured at its grounded end to a post. The secured end simulated an infinite length of pipe resting on the sea floor and resistant to longitudinal forces. The buoyant portion of the pipeline remained elevated in the water at a depth of about one foot above the bottom of the pond. In this manner, a one-foot length of each of the link chains rested on the pond floor.

A pull line was then connected to the buoyant end of the pipeline and run through a sheave located at a preselected termination point or pull-in point. The pull-in point was initially located a distance of 55 feet laterally from the pipeline. Referring back to FIG. 5, this lateral distance is indicated as the offset of the pipeline from the pull-in point. The distance of the end of the pipeline beyond the pull-in point is referred to in FIG. 5 as the overshoot. For the first test the overshoot of the pipeline end was 27½ feet. The buoyant end of the pipeline was then pulled toward the pull-in point by reeling in the pull line. When the pipeline end reached the pull-in point its entry angle with respect to the perpendicular to the pull-in point was measured. (See FIG. 7 for illustration of the entry angle.) The pipeline bending procedure was repeated a number of times with variations being made in the offset and overshoot distances. Entry angles were measured for each test. In all of the tests no buckling or permanent deformation of the pipeline was observed. The pipeline bent smoothly in a well defined arc even when the offset or overshoot distances caused the pipeline to enter at a steep entry angle, i.e., in a non-perpendicular direction.

Figure 9:
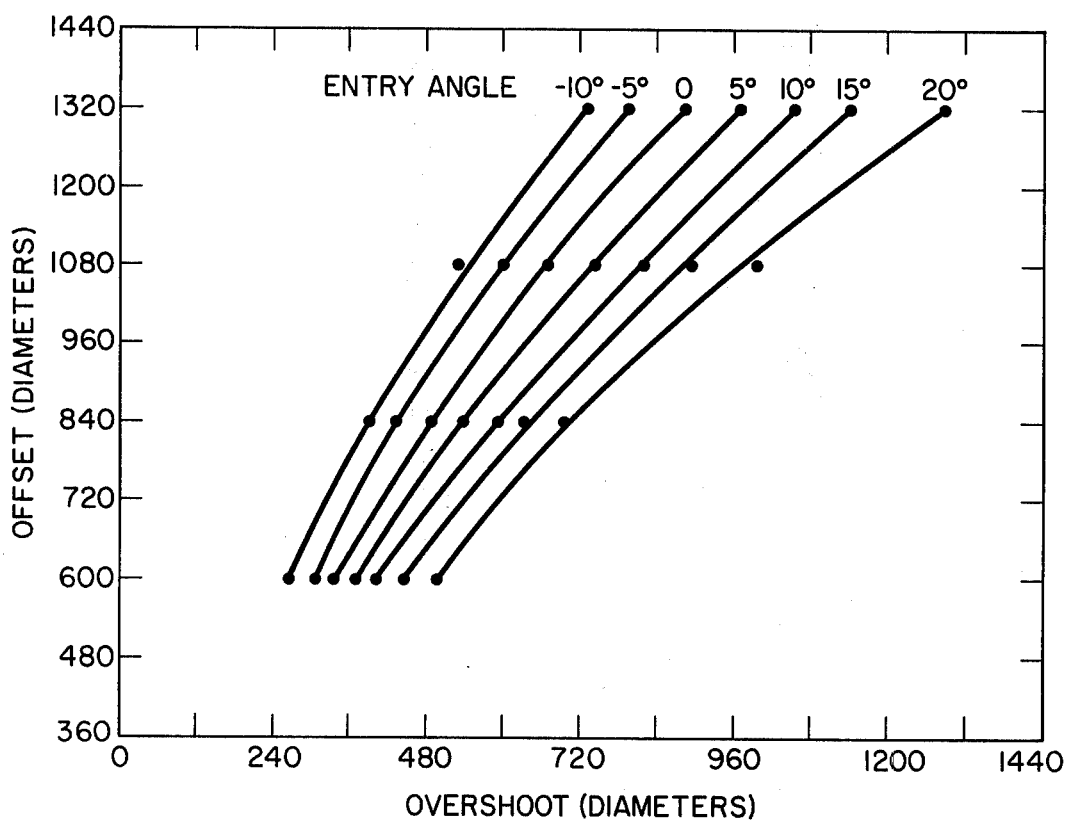
FIG. 9 is a plot of offset versus overshoot distances for a pipeline bending operation at various entry angles.

The results of the tests are summarized in FIG. 9 which plots offset versus overshoot for various entry angles. All distances have been converted to pipe diameters so that the results of the tests may be readily scaled up for any size pipeline. Since in some situations it is preferable to have an entry angle as close to 0° as possible to permit easy connection of the pipeline end to the pull-in point, the 0° correlation of offset and overshoot would be followed for designing many pipeline bending operations employing the present invention. For example, if it appeared that a pipeline would ultimately align at an offset of 1000 diameters from the pull-in point then sufficient pipe should be laid so that the pipeline end overshoots the pull-in point by about 600 diameters. However, should the pipeline approach the pull-in point at an oblique angle then it may be desirable to have an entry angle which compensates for the oblique approach angle.

The method of the present invention resolves the problems of the prior art by permitting a flowline connection of a rigid pipeline to be made without adjusting the length of the pipeline and without using cumbersome spool piece connections. The method presented herein enables the controlled underwater bending of pipelines and other rigid flowlines without the danger of buckling, deforming or otherwise damaging the pipe. It should be apparent from the foregoing that the method of the present invention offers significant advantages over pipeline connecting techniques previously known in the art. It will be appreciated that while the present invention has been described with regard to the foregoing embodiments, numerous variations and modifications, including changes in size shape and construction may be made in the embodiments described herein without departing from the broad inventive concept hereinafter claimed.

I claim:

1. A method of bending a terminal portion of a pipeline submerged in a body of water comprising:
   buoyantly elevating said terminal portion of the pipeline to a position above the bottom of said body of water; and
   pulling in the end of said elevated portion to a point of termination while simultaneously applying a drag force to said elevated portion which is sufficient to cause said pipeline to bend along a well defined arc.

2. The method of claim 1 wherein buoys are attached to the terminal portion of said pipeline along its length to provide said pipeline with buoyant elevation.

3. The method of claim 1 wherein said pipeline is buoyantly elevated a short distance above the bottom of said body of water.

4. The method of claim 1 wherein said drag force is applied by dragging means attached to the terminal portion of said pipeline which contacts the bottom of said body of water.

5. The method of claim 4 wherein said dragging means are chains which partially rest on the bottom of said body of water when said pipeline is elevated.

6. The method of claim 4 wherein said dragging means are heavy cables which partially rest on the bottom of said body of water when said pipeline is elevated.

7. The method of claim 4 wherein said dragging means are clump weights which partially rest on the bottom of said body of water when said pipeline is elevated.

8. The method of claim 1 wherein said pipeline is pulled to a point of termination by a cable extending from the end of said pipeline to said point of termination.

9. A method of bending a terminal portion of a pipeline submerged in a body of water comprising:
   elevating said terminal portion of the pipeline to a position above the bottom of said body of water by attaching buoys to said terminal portion;
   pulling in the end of said elevated portion to a point of termination while simultaneously applying a drag force to said elevated portion which is sufficient to cause said pipeline to bend along a well defined arc, said drag force being applied by dragging means attached to the terminal portion of said pipeline which contact the bottom of said body of water as the pipeline is pulled.

10. The method of claim 9 wherein said dragging means are chains which partially rest on the bottom of said body of water when said pipeline is elevated.

11. The method of claim 9 wherein said dragging means are heavy cables which partially rest on the bottom of said body of water when said pipeline is elevated.

12. The method of claim 9 wherein said dragging means are clump weights attached to said pipeline which partially rest on the bottom of said body of water when said pipeline is elevated.

13. A method of bending a terminal portion of a pipeline to effect a subsea connection of said pipeline comprising:
   attaching buoys and dragging means to the terminal portion of said pipeline prior to laying said terminal portion in a body of water, said buoys providing sufficient buoyancy to elevate the terminal portion of said pipeline a short distance above the bottom of said body of water so that said dragging means contact the bottom of said body of water; and
   pulling in the end of said elevated portion of pipeline to a point of termination while said dragging means simultaneously apply a drag force to said elevated portion which is sufficient to cause said pipeline to bend along a well defined arc.

14. The method of claim 13 wherein said pipeline is pulled to a point of termination by a cable extending from the end of said pipeline to said point of termination.

* * * * *